United States Patent [19]

Umeda

[11] Patent Number: 5,043,128
[45] Date of Patent: Aug. 27, 1991

[54] METHOD OF FORMING PLASTIC COMPOSITE MATERIAL

[75] Inventor: Katsuhiko Umeda, Kodaira, Japan

[73] Assignee: Shin Nihon Koku Seibi Kabushiki Kaisha, Tokyo, Japan

[21] Appl. No.: 453,376

[22] Filed: Dec. 27, 1989

Related U.S. Application Data

[63] Continuation of Ser. No. 206,382, Jun. 14, 1988, abandoned.

[30] Foreign Application Priority Data

Jun. 27, 1987 [JP] Japan .................. 62-158820

[51] Int. Cl.$^5$ ............................................. B29C 43/30
[52] U.S. Cl. ................................. 264/258; 264/280; 264/285; 264/294; 264/324
[58] Field of Search ............... 264/258, 294, 280, 285, 264/324

[56] References Cited

U.S. PATENT DOCUMENTS

| | | | |
|---|---|---|---|
| 2,779,388 | 1/1957 | Quoss ................................ | 264/285 |
| 2,938,566 | 5/1960 | Toulmin, Jr. ...................... | 264/174 |
| 3,234,309 | 2/1966 | Graff ................................. | 264/257 |
| 3,615,149 | 10/1971 | Malone et al. .................... | 264/324 |
| 4,515,848 | 5/1985 | Leunig et al. ..................... | 264/324 |

FOREIGN PATENT DOCUMENTS 96825  6/1982  Japan .................................. 264/258
2101033  1/1983  United Kingdom ............... 264/294

OTHER PUBLICATIONS

Handbook of Composites edited by George Lubin, "Continuous Manufacturing Process", by W. B. Goldsworthy, Chapter 17, pp. 479-490, Van Nostrand Reinhold Company, 135 West 50th St., New York, N.Y. 10020.

Productive Systems for Profitable Pultrusion, a brochure, from Pultrusion Technology, Inc., date unknown.

The Pulmaster, a brochure, from Goldsworthy Engineering, Inc., date unknown.

*Primary Examiner*—James Lowe
*Attorney, Agent, or Firm*—Armstrong, Nikaido, Marmelstein, Kubovcik & Murray

[57] ABSTRACT

A method for heating and press-forming a plied material sheet prepared by impregnating a thermosetting resin into sheets of parallely disposed plastic fiber or into sheets of woven fabric of plastic fiber. The material sheet is formed into an operation which repeats the steps of heating and press-forming such material sheet within a shaping mold on a heating and press-forming apparatus for a predetermined time period and then releasing the pressure for a predetermined time period while step-feeding the material sheet over a predetermined distance for a time period less than the time period of such released pressure.

14 Claims, 2 Drawing Sheets

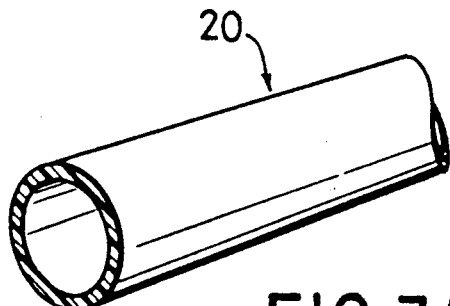
FIG.3(a)
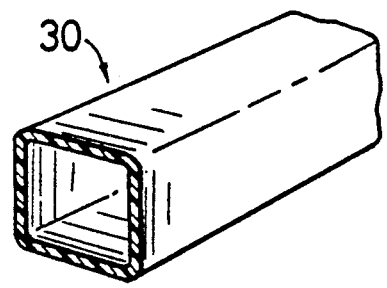
FIG.3(b)
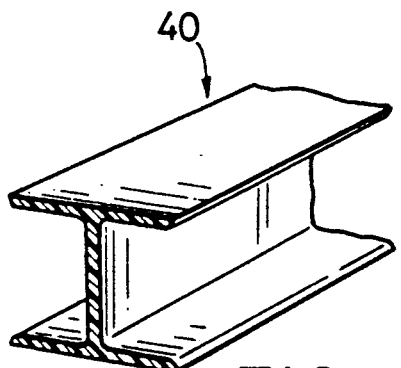
FIG.3(c)
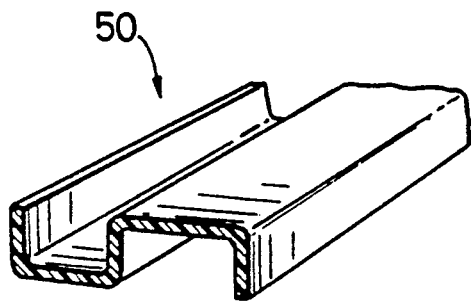
FIG.3(d)
FIG.5
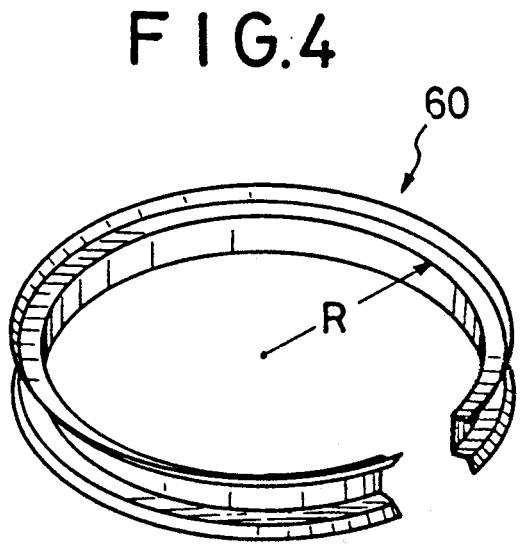
FIG.4
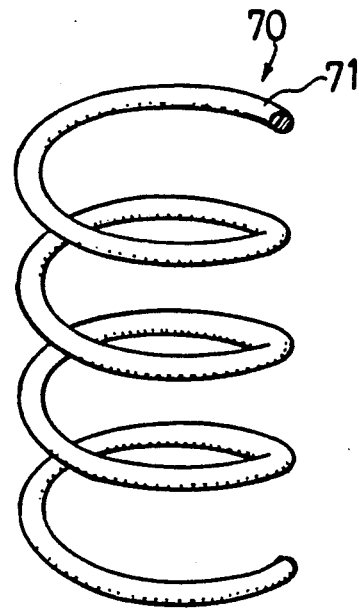

METHOD OF FORMING PLASTIC COMPOSITE MATERIAL

This application is a continuation of application Ser. No. 206,382 filed June 14, 1988 and now abandoned.

BACKGROUND OF THE INVENTION

1. Field of the Invention

This invention relates to a method of forming plastic composite material, and more particularly to a method of forming to shape plastic products by composite material combining fiber reinforced plastic material with a thermosetting resin.

2. Description of the Prior Art

For producing plastic products of circular shapes or channel materials of I- and V-shapes in section by molding a plastic mat material reinforced with fiber such a carbon fiber aramid fiber or glass fiber, there has been known a method of impregnating a thermosetting resin into a plastic mat material while passing the same continuously through a heated mold and thermosetting the plastic mat and the resin.

In this conventional method, a composite material mat is firstly formed by plying woven fabric of carbon fiber or the like and rovings of carbon fiber and glass fiber in multiple layers, followed by needle punching.

Nextly, the composite material mat is pressed into a heated mold while simultaneously injecting a thermosetting resin into the heated mold, thermosetting the resin-impregnated mat and simultaneously drawing the same continuously out of the mold to obtain the molded product.

In the above-described conventional method, a great frictional force occurs between the mold and the material which is being formed into a predetermined shape by the drawing operation.

In order to lessen this frictional force, it has been a compulsory requisite to employ a polyester resin with a small frictional coefficient though low in strength. However, recent improvements to the forming method have made it possible to use epoxy resins of high strength in spite of a large frictional coefficient.

An advantage of the products which are obtained by this forming method resides in that they have high strength per weight, permitting to provide products of given strength in a smaller weight as compared with, for instance, products of light alloy materials. Consequently, the products of this forming method are considered to be suitable for application to structural materials for transportation equipments including structural materials for aircrafts.

However, the application of the products of the conventional molding method as aircraft structural materials involves the following problems to be solved.

(1) The weight ratio of fiber to resin is 60% to 40%, that is to say, the fiber proportion is too small, so that it is difficult to obtain a product of high strength.

(2) The resin has to be thermally set within a relatively short period of time while the material is being passed through the heated mold, so that it is difficult to obtain a product of uniform strength through controlling thermosetting reaction.

(3) The great frictional force which occurs between the mold and the material during the molding process necessitates to apply a lubricant on the surfaces of the mold.

(4) The release material which is mixed with the resin during the molding process remains on the surfaces of the products.

The residue of the release material on the surface of the product makes it difficult to apply an adhesive thereto or to bond the product to other components.

(5) The composite material mat is shaped by forcibly drawing the same through a mold, so that the fiber on the surface of the material is apt to be dragged and aligned in the drawing direction (in the longitudinal direction) by the frictional contact with the mold surface, encountering the difficulty in molding the material such that the fiber layers are plied with a fiber inclination of 45 degrees with respect to the drawing direction.

Therefore, it has been almost impossible to control the torsional strength of the products.

One of the causes of the above-mentioned problems is considered to be the manner of pressing the material in the molding process. Pressure is applied to the material in the molding stage for smoothing the surface of the product and uniformalizing the product quality.

As means for producing the pressing force, the conventional molding method forms a mat by interposing roving and non-woven fabric in layers between fibrous woven fabric to utilize the reaction force of the roving and non-woven fabric as the mat is squeezed into the mold.

Therefore, it has been difficult to obtain a large pressure force and to increase the proportion of the fibrous woven fabric in the mat which is composed of the fibrous woven fabric, roving and non-woven fabric. Since the strength of the product is mainly imparted by the woven fabrics of carbon and glass fibers, products of extraordinarily high strength have been difficult to make for the reasons stated above.

In addition, as the drawing operation is performed under the pressurized state, the use of a release material has been inevitable in order to lessen the large friction which occurs between the mold and the product.

Further, the conventional forming method which resorts to the drawing operation for shaping the material is restricted to linear products alone.

SUMMARY OF THE INVENTION

It is an object of the present invention to provide a method of forming a fiber-reinforced plastic composite material by intermittently pressing and heating same within a mold.

It is another object of the present invention to provide a method of forming a plastic-base composite material, in which the proportion of fiber in the fiber to plastic ratio can be increased.

It is still another object of the present invention to provide a method of forming a plastic-base composite material into a product which has open or closed ends in sectional shape.

In order to achieve the above-mentioned objects, a fiber-reinforced plastic material is formed by application of heat and pressure with intermittent pressurization and by feeding the plastic material in a pressure-released period, continuously forming the material into the shape of the ultimate product by repeating these operations.

In accordance with the present invention, the fiber-reinforced plastic material is formed by intermittent strong pressurization and heating for thermosetting, and fed little by little in pressure-released periods, while permitting the shape the material smoothly without necessitating a special surface treatment or a release material.

In the present invention, for example, preimpregnated carbon fiber sheet which has a thermosetting resin impregnated into carbon fiber sheet is prepared as a basic material of the fiber-reinforced plastic material, using the carbon fiber in the form of a woven fiber sheet or a uni-directional fiber sheet.

Instead of carbon fiber, aramid or glass fiber is also used, and epoxy resin or phenol resin is prepared for a thermosetting resin.

Depending upon the shape of the final product, roving is interposed between overlapped material sheets in the same manner as in the conventional methods.

BRIEF DESCRIPTION OF THE DRAWINGS

In the accompanying drawings:

FIGS. 3(a) to 3(d) are perspective views showing examples of products formed in accordance with the present invention;

FIG. 4 is a perspective view showing another example of the product formed in accordance with the present invention; and FIG. 5 is a perspective view showing still another example of the product formed in accordance with the present invention.

DETAILED DESCRIPTION OF THE PREFERRED EMBODIMENTS

Figure 1:
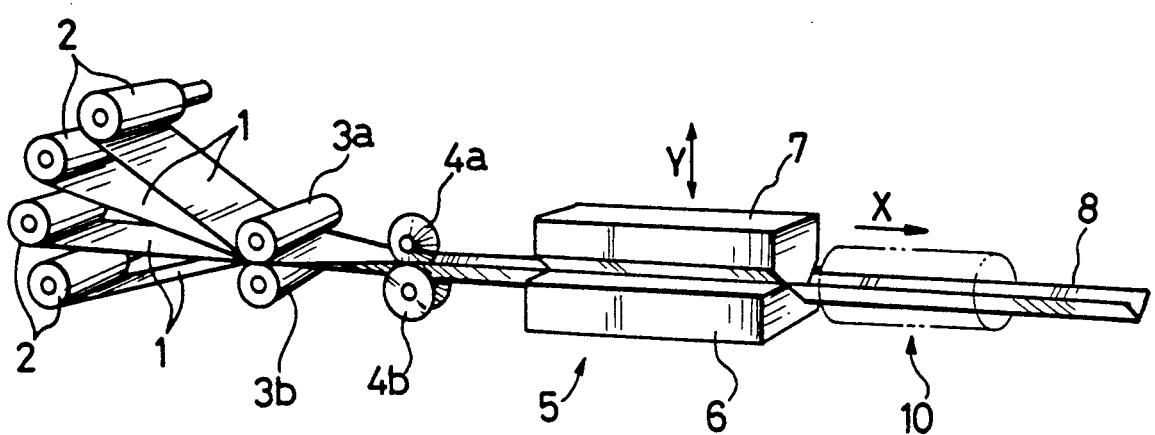
FIG. 1 is a schematic illustration of the general arrangement in the plastic material forming stage.

Now, the invention is described more particularly by way of the preferred embodiments shown in the drawings.

Referring to FIG. 1, there is schematically shown a general arrangement in the plastic material forming stage according to the present invention.

Indicated at 1 are woven fiber sheets of uni-directional fiber sheets each formed with carbon fiber preimpregnated with a thermosetting epoxy resin, and fed forward from rolls 2. In the embodiment shown in FIG. 1, four material sheets 1 supplied from four rolls 2 are plied one on another. The number of the plying material sheets is selected depending upon the nature of the product.

The material sheets 1 which are supplied from the respective rolls 2 are passed through a pair of feed rollers 3a and 3b and sent to a unit of a pair of shaping rollers 4a and 4b. Units of various shapes of rollers are provided depending upon the shapes of the product to be obtained by the forming operation.

A forming operation for producing a channel material of V-shape in section is exemplified in the particular embodiment shown in FIG. 1, in which the unit of shaping rollers 4a and 4b are so shaped as to form a flat material sheet into V-shape by folding the same at a transversely central position. The material sheet 1 which has been folded into V-shape by the shaping rollers 4a and 4b is fed to a hating and press-forming device 5.

The heating and press-forming device 5 is constituted by a heating die 6 and a press punch 7 which engages the heating die 6. The heating die 6 is fixed and constantly heated by a heating means which is not shown. The press punch 7 is moved up and down in the direction of the arrow Y by an actuator (not shown) and intermittently driven onto the die 6 to heat and press the material sheet 1.

The material sheet 1 which has been fed onto the die 6 is temporarily stopped there, whereupon the press punch 7 is lowered by an actuator, not shown, to press the material sheet 1 against the die 6. Since the die 6 is heated, the material sheet 1 simultaneously undergoes pressing and heating between the press punch 7 and the heating die 6, as a result thermosetting the impregnated epoxy resin in the material sheet 1.

After pressing the press punch 7 onto the die 6 for a predetermined time period, the pressing action of the actuator is released and the press punch 7 is lifted away from the heating die 6.

Nextly, a shaped work 8 is fed stepwise over a predetermined distance in the direction of the arrow X by a feeding device which is not shown. After the shaped work 8 has been step-fed over the predetermined distance in the direction of the arrow X, the operation of the feeding device is paused to stop the material sheet 1 on the heating die 6. After stopping the material sheet 1 on the heating die 6, the press punch 7 is lowered to carry out the heating and pressing again.

For the feeding device, there may be employed a suitable device like a punch roller device or a gripper feeding device which is driven intermittently.

Figure 2:
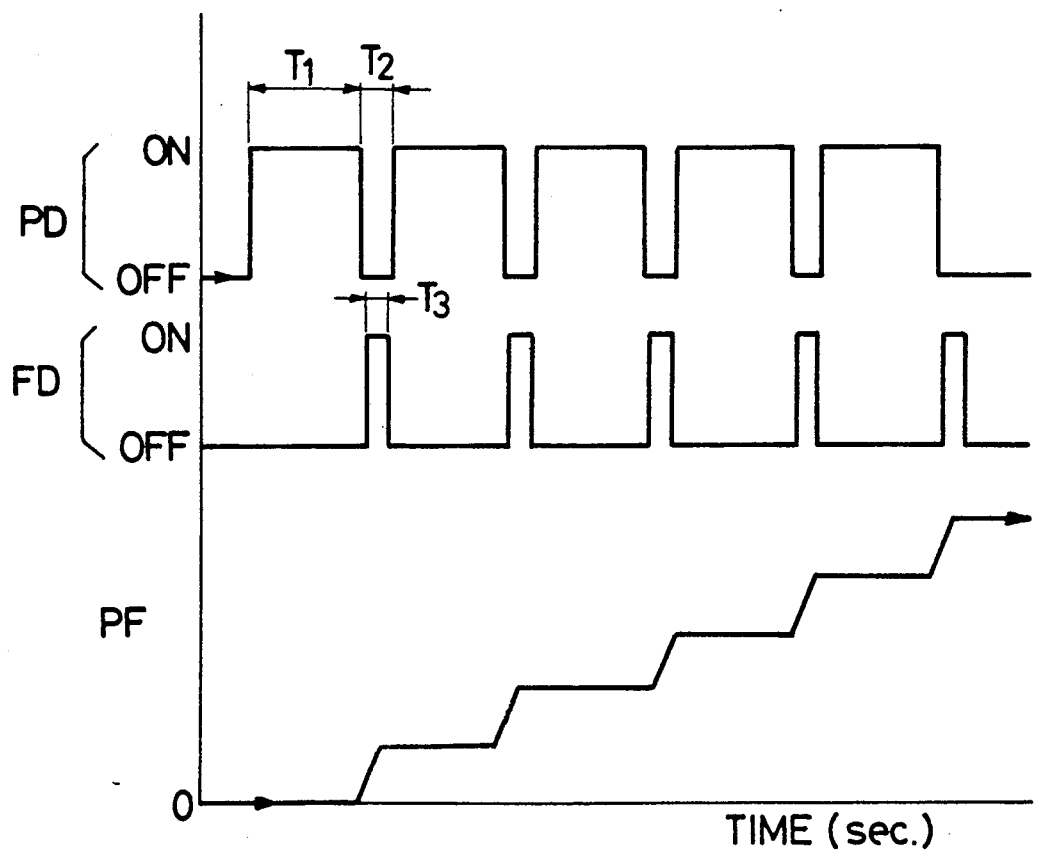
FIG. 2 is a graph showing the operational timings of a press forming device and a feeding device in accordance with the present invention along with the progress of the forming operation.

Shown in FIG. 2 is a chart showing on-off timings of the press forming device (PD) and feeding device (FD) on the vertical axis along with the progress of forming (PF), against time T on the horizontal axis.

More specifically the press punch 7 is lowered and fitted into the heating die 6 to effect the heating and pressing for a time period of $T_1$ while stopping the feeding of the material sheet during that period. Nextly, the press punch 7 is lifted up in the direction of arrow Y to release the pressing force for a time period $T_2$. During the time period $T_2$, the feeding device (not shown) is actuated for a time period of $T_3$ to feed the material sheet 1 in the direction of the arrow X.

The above-described cycle of operation is repeated to form the material sheet 1 stepwise within the heating and pressing device 5, into the shape of a final product 8.

Namely, the pressure which is applied to the press punch is released for a predetermined time period to feed the material sheet 1 over a small distance by slipping the same in a clearance formed between the press punch and the heating die, and this is repeated during the forming operation.

In a case where there is a necessity for prolonging the thermosetting time for the product, a heating furnace 10 may be located in a posterior portion of the heating and pressing device 5 as indicated by broken line in FIG. 1. The product 8 which is of an elongated form is cut into suitable lengths depending upon the purpose of use.

In the forming method according to the present invention, the mold which is designed in conformity with the shape of the product is split into a part on the side of the punch and a part on the side of the heating die. The material which is interposed between the punch and die is pressed by pressing the punch toward the die, so that it is possible to apply a large pressing force for forming the material and therefore to thermoset the product to shape by the use of a smaller amount of the resin as compared with the conventional method, permitting to increase the proportion of the fiber, for example, to about 70% fiber against 30% resin in the fiber to resin ratio. As a result, the strength of the product can be increased.

The pressing force is released when feeding the material 1 in the direction of the arrow X in the forming device 5, so that the frictional force between the material 1 and the press punch 7 or the heating die 6 is minimized to an ignorable value. It follows that, even when the fiber which constitutes the material sheet 1 is fed with the longitudinal direction thereof obliquely to the direction of the arrow X, for example, at the angle of 45 degrees, there is almost no possibility of the fiber angle being disturbed by the frictional force. Consequently, the fiber in the product 8 which comes out of the forming operation is aligned accurately at 45 degrees with the longitudinal axis of the product, improving the torsional strength of the product as the torsional stress applied to the product 8 is counteracted by the reaction force of the fiber.

Although products of various shapes can be formed by the present invention, FIG. 3 exemplifies products of four different sectional shapes. More specifically, the products shown in FIGS. 3(c) and 3(d) have open sectional shapes similarly to the V-type channel product 8 of FIG. 1, FIG. 3(c) illustrating and I-type beam product 40. The size and wall thickness of the beam product 40 can be varied in a variety of ways by suitably selecting the number or width or other dimensions of the material sheets 1.

FIG. 3(d) illustrates an example of an angle product 50 with a sectional shape of point symmetry. The products 40 and 50 of FIGS. 3(c) and 3(d), which have open sectional shapes, can be formed from the material sheet by the use of the combination of the press punch and the die of the heating and pressing device.

A cylindrical product 20 of a circular sectional shape shown in FIG. 3(a) and a tubular product 30 of a square sectional shape shown in FIG. 3(b), both having a closed sectional shape, are formed by the use of combination of a inflatable mandrel and a heating die.

The products shown in FIG. 3 all have a rectinlinearly extending axis, so that they can be formed by linearly feeding the material sheet in the direction of the arrow X in the same manner as in the embodiment of FIG. 1.

Referring now to FIG. 4, in order to form a product 60 in the form of a ring with a radius R, the press punch and die are designed to have curved joining surfaces. The product 60 of this shape is useful, for example, for frame members of an aircraft body with a circular sectional shape.

Further, as shown in FIG. 5, a coil spring 70 can be produced by folding a material sheet into a roll to form a rod-like material 71 and at the same time it is formed by means of a press punch and a die each with a small radius of curvature.

In case of the coil spring 70, the strong torsional stress which occurs to the material 71 can be born up suitably by orienting the fiber in the direction in which the stress acts.

As clear from the foregoing description, the forming method in accordance with the invention employs a plastic material sheet preimpregnated with a thermosetting resin, gripping the material between a press punch and a die which are mounted in a heating and pressing device and intermittently subjecting the same to the press-forming operation while step-feeding the material in the intervening periods where the pressing force is released, thereby permitting the form elongated products by the use of a press punch and die unit of short dimensions.

Besides, it is possible to apply a large pressing force to the material as it is compressed between the press punch and the die. Consequently, the proportion of the epoxy resin necessary for forming the material can be reduced, permitting to increase the proportion of the plastic fiber, for example, to 70% plastic fiber against 30% epoxy resin in the weight ratio of fiber to resin. It follows that the strength of the products can be increased accordingly. The material which is gripped between the press punch and die is fed stepwise in the period when the pressure on the press punch is released, so that the frictional force between the material and the press punch or the die is minimized to a marked degree as compared with the conventional drawing method. Therefore, the forming operation can be carried out smoothly without resorting to a release material, and the products which have no oil residue of release material on their surfaces can be bonded to other parts by means of an adhesive.

Further, when step-feeding the material, there is no possibility of the material surfaces being abraded by the press punch or die surfaces. Therefore, even when the plastic fiber filaments are aligned at certain angles with the material feed direction, the press-forming operation can be performed without disturbing the fiber angles. As a result, it becomes possible to improve the torsional strength of the products.

The plastic composite materials produced by the forming method of the invention has a number of advantages over the products formed by the conventional drawing method as described hereinbefore, and can find applications in various fields, for example, in the field of primary structural materials for aircrafts, which require high strength.

What is claimed is:

1. A method of longitudinally forming plastic composite continuous strip material into press formed structural shapes longitudinally along said strip material, said structural shapes having substantially identical uniform cross-sections in planes perpendicular to the longitudinal axis of said plastic composite continuous strip material, which comprises:

(a) longitudinally feeding said continuous strip of plastic composite material through shaping means to longitudinally shape said continuous strip and feeding said continuously shaped continuous strip to a heating and press-forming apparatus in longitudinal alignment with said continuous strip in a length to at least longitudinally cover said longitudinally aligned heating and press-forming apparatus with said continuous strip;

(b) after said heating and press-forming apparatus is covered with said continuous strip, stopping said continuous strip for a predetermined time period;

(c) after said continuous strip is stopped and during said predetermined time period, simultaneously heating and press-forming said predetermined length of said plastic composite material covering said heating and forming apparatus into said structural shape;

(d) releasing pressure from said plastic composite material formed into said structural shape after said predetermined time period for a time period $T_2$; and longitudinally feeding said continuous strip of plastic composite material stepwise for a period $T_3$ while said pressure is released from said plastic composite material, said period $T_3$ being less than said period $T_2$ and repeating steps (a) to (d) to obtain a continuous longitudinal pressure formed structural shape longitudinally along said continuous strip material.

2. The method as defined in claim 1, wherein said plastic composite material is a sheet of resin-impregnated fiber.

3. The material as defined in claim 2, wherein said fiber is glass fiber.

4. The material as defined in claim 2, wherein said fiber is carbon fiber.

5. The material as defined in claim 2, wherein said fiber is aramid fiber.

6. The material as defined in claim 2, wherein said resin is an epoxy resin.

7. The material as defined in claim 2, wherein said resin is a phenol resin.

8. The material as defined in claim 2, wherein said sheet is a resin-impregnated woven fabric sheet.

9. The material as defined in claim 2, wherein said sheet is a resin-impregnated unidirectional fiber sheet.

10. The method as defined in claims 1 or 2, wherein said plastic composite material includes roving fabric plied between material sheets.

11. The method as defined in claims 1 or 2, wherein said plastic composite material includes non-woven fiber plied between sheets.

12. The method as defined in claim 1, wherein said heating and press-forming apparatus includes a press punch and a heating die.

13. The method as defined in claim 1, wherein said shaped product is an open sectional shape.

14. The method as defined in claim 1, wherein said shaped product is a closed sectional shape such as closed circular or box-like shape.

* * * * *